US006370401B1

(12) United States Patent
Baranowski et al.

(10) Patent No.: US 6,370,401 B1
(45) Date of Patent: Apr. 9, 2002

(54) STORAGE CASE AND METHOD FOR A WIRELESS HEADSET WITH A MICROPHONE SUSPENDED BETWEEN EARPIECES OF THE HEADSET

(75) Inventors: Robert Baranowski, San Diego; Roger William Berg, Carlsbad, both of CA (US)

(73) Assignees: Sony Corporation (JP); Sony Electronics, Inc., Park Ridge, NJ (US)

( * ) Notice: Subject to any disclaimer, the term of this patent is extended or adjusted under 35 U.S.C. 154(b) by 0 days.

(21) Appl. No.: 09/431,781

(22) Filed: Nov. 2, 1999

(51) Int. Cl.[7] .................................................. H04B 1/38
(52) U.S. Cl. ........................ 455/569; 455/90; 455/348
(58) Field of Search ................................. 455/569, 344, 455/346, 348, 347, 350, 575, 90, 351; 379/430, 438

(56) References Cited

U.S. PATENT DOCUMENTS

| | | | | |
|---|---|---|---|---|
| 3,668,334 A | * | 6/1972 | Schwake | 179/107 R |
| 3,984,645 A | * | 10/1976 | Kresch | 179/156 |
| 4,062,608 A | * | 12/1977 | Pierce | 339/5 RL |
| 4,409,442 A | * | 10/1983 | Kamimura | 179/156 R |
| 4,856,086 A | * | 8/1989 | McCullough | 455/344 |
| 4,882,745 A | * | 11/1989 | Silver | 379/61 |
| 5,099,519 A | * | 3/1992 | Guan | 381/183 |
| 5,303,305 A | * | 4/1994 | Raimo et al. | 381/68 |
| 5,339,461 A | * | 8/1994 | Luplow | 455/351 |
| 5,721,775 A | * | 2/1998 | Leifer | 379/430 |
| 6,047,076 A | * | 4/2000 | Yang | 381/381 |
| 6,059,213 A | * | 5/2000 | Phillips | 242/378.4 |
| 6,144,864 A | * | 11/2000 | Lands et al. | 455/569 |
| 6,230,029 B1 | * | 5/2001 | Hahn et al. | 455/568 |

* cited by examiner

Primary Examiner—Daniel Hunter
Assistant Examiner—C. Chou
(74) Attorney, Agent, or Firm—Rader, Fishman & Grauer PLLC; Ronald P. Kananen, Esq.

(57) ABSTRACT

A headset case for a wireless headset allows the headset to be coiled for safe storage and convenient transport. A circuitry cabinet of the headset is secured to a rotating spool that is then rotated to wind up wired connections between the cabinet and the headphones of the headset. Finally, the headphones are secured on the case. Preferably, the case is integrated into an audio or telephone unit with which the headset is used.

38 Claims, 4 Drawing Sheets

STORAGE CASE AND METHOD FOR A WIRELESS HEADSET WITH A MICROPHONE SUSPENDED BETWEEN EARPIECES OF THE HEADSET

FIELD OF THE INVENTION

The present invention relates to the field of headphones or headsets for listening to audio programming. The present invention also relates to the field of wireless or cordless telephony. More specifically, the present invention relates to a storage and carrier apparatus for a wireless headset with a microphone suspended between earpieces of the headset that can be used for both listening to audio programming and interfacing with a wireless or cordless telephone unit.

BACKGROUND OF THE INVENTION

Headphones or headsets have long been used as a means of privately listening to audio programming, particularly music. Such headphones are commonly capable of producing extremely high quality audio. Headphones can be used with a radio tuner, a compact disc or tape player, a personal stereo, a television, a larger shelf or home stereo, a computer or any other device outputting an audio signal.

Headphones are conventionally connected to an audio signal source with a wire that provides a separate stereo signal to each of two speakers located respectively over, or in, the user's two ears. The speakers may be held in place by a band that rests over the top of the user's head. Alternatively, the speakers may be individually secured in, or on, the user's ears.

An emerging technology allows headphones to wirelessly receive an audio signal from an audio signal source without a wire-line connection to the audio signal source. This allows the user to move around freely within range of the audio signal source and still enjoy the audio programming being provided through the headphones.

In another field, cordless and wireless telephony similarly allows users to make and receive telephone calls from anywhere within a range of the cordless phone base unit or within a wireless service area. Some cordless phones also make use of a headset, e.g., a pair of headphones or an ear-piece secured to, or on, one of the user's ears, wired to the cordless telephone handset to allow the wearer to hear the incoming audio signal of a phone call. A microphone mounted on the headset allows the user to speak and, thereby, conduct a telephone call.

The use of headsets for listening to audio programming and for conducting wireless or cordless telephone calls has now converged. In a related patent application, U.S. Ser. No. 08/950,833, filed Oct. 15, 1997 (incorporated herein by reference in its entirety), it was suggested that a single pair of headphones could be used for both enjoying audio programming from an audio signal source and conducting a cordless telephone call. However, problems remain integrating into a single pair of headphones the functions of providing high quality audio programming and conducting a telephone call.

For example, when conducting a telephone call, the user must be provided with a microphone into which he or she can speak. However, the presence of such a microphone is unnecessary and, perhaps, annoying when the user merely wishes to listen to audio programming. Consequently, there is need in the art for an improved headset that incorporates a microphone in an unobtrusive manner so that the microphone is available when necessary to conduct a telephone conversation, but not in the user's way otherwise.

To address this need, a wireless headset for use with both an audio signal source and a wireless or cordless telephone unit was previously disclosed by the inventors of this patent application. FIG. 1 illustrates this headset (100) in accordance with the inventors' previous disclosure referenced above.

The headset (100) includes a pair of headphones (101). Each headphone (101) includes a speaker, and any speaker housing, that is supported in, on or over the left or right ear of the user. Each of the headphones (101) may receive, respectively, the left or right channel signal of a stereo audio programming signal so as to provide a reproduction of high-fidelity audio programming, e.g., music, for the user.

While many configurations for the headset (100) are possible, a preferred embodiment is a headset in which the headphones (101) are hung on or lodged in the user's ears without being connected by a headband that rests atop a user's head. As shown in FIG. 1, each headphone (101) could be an "earbud" headphone (101) that is gently lodged by the user in the ear over the opening of the ear canal. In such an arrangement, the structure of the ear naturally holds the headphone (101) in place so that the audio programming signals being received by the headset (100) are reproduced as audible sound directly into the ears of the user. In other alternatives, the headphones (101) could each include a hook or band that is hung over the top of the ear, or a clip for clipping the headphones (101) to the user's ear, for example, to the ear lobe, so as to locate the headphone (101) over the opening of that ear.

Additionally, the headset (100) is also intended to allow the user to conduct telephonic communication by interfacing with a phone unit. In order for the headset (100) to be used in conducting a telephone call, it must incorporate a microphone for transducing the speech of the user. Consequently, a microphone or circuitry cabinet (103) is suspended by wired connections (102) between the two headphones (101). With the headphones (101) supported in, on or over the user's ears, the circuitry cabinet (103) is, in turn, supported preferably in a location just under the user's chin near the user's mouth.

FIG. 2 illustrates the circuitry cabinet (103) in detail. As shown in FIG. 2, the circuitry cabinet (103) provides a microphone (201) that can be used to conduct a telephone call with the headset (100). Although, the circuitry cabinet (103) need not include a microphone if the headset (100) is to be used exclusively for reception of an audio signal and not for telephonic communication. The audio signal produced by the microphone (201) is sent, via processor (212), to a transceiver (203).

The transceiver (203) allows the headset (100) to communicate with an audio signal source (210) and a telephone unit (211). The telephone unit (211) may be, for example, a cordless telephone base unit connected by wire through a wall outlet to a public switch telephone network (PSTN) or a wireless telephone unit communicating wirelessly with the radio telephony infrastructure of a service provider.

The headset (100) communicates with both the audio signal source (210) and the telephone unit (211) by wireless links (214, 215). In this way, the user can move freely within some limited range of the audio signal source (210) and telephone unit (211). The wireless links may be implemented with several different signaling formats, for example, optical or radio frequency signaling.

FIG. 2 illustrates the preferred embodiment that uses radio frequency signaling. As shown in FIG. 2, a radio transceiver (203) with an antenna (204) is provided. Using the antenna (204), the circuitry cabinet (103) can receive wireless signals from either the audio signal source (210) or the telephone unit (211). In communicating with the telephone unit (211), the transceiver can also transmit signals generated by the microphone (201) to provide the two-way communication necessary to conduct a telephone call.

A battery (202) is also provided within the circuitry cabinet (103) to provide power for the components of the cabinet (103). The battery (202) may be recharged when the headset (100) is not in use.

The circuitry cabinet (103) preferably also includes a user input device (213) that allows the user to control whether the headset (100) is receiving and reproducing an audio programming signal from the audio signal source (210) or communicating with the telephone unit (211) to conduct a telephone call.

This user input device (213) may be used to answer an incoming phone call. Additionally, if the user is listening to audio programming from the audio signal source (210) and desires to make a telephone call, the user may actuate the user input device (213) causing the headset (100) to open two-way communication with the telephone unit (211) so as to place an outgoing call.

If the user input device (213) includes a keypad, the user may enter the number to be called using the user input device (213). Alternatively, the user may indicate the number to be called by dialing the number with a keypad or other control device on the telephone unit (211). The user may also enter the number to be dialed with a remote control unit (216). Finally, the user may speak a phone number or an indication of the phone number to be called, such as the name of the person or party to be called, into the microphone (201) of the circuitry cabinet (103). The user's voice is transmitted to the telephone unit (211) where a voice recognition system (217) recognizes the speech of the user and either dials the number spoken or responds to the other indication of the party to be called and dials the appropriate phone number, which may have been preprogrammed by the user.

While this system, illustrated in FIGS. 1 and 2, provides the user with vastly improved versatility in enjoying both audio programming from the audio signal source (210) and telephonic communication via the telephone unit (211), it also creates potential problems due to the construction of the wireless headset (100) as a separate, unconnected unit. For example, it may become difficult to transport the headset (100) without tangling the wire connections (102) between the circuitry cabinet (103) and the headphones (101). Damage to the headset (100) may also occur during transportation. A further problem may arise if the headset (100) becomes separated from the phone unit (211) and audio signal source (210) and is not available when desired.

Consequently, there is a need in the art for a method and apparatus of conveniently storing and carrying a wireless headset, such as that illustrated in FIG. 1, while also protecting it from damage. Moreover, there is a further need in the art for a method and device for preventing such a headset (100) from being separated from the phone unit (211) or audio signal source (210) with which it is used.

SUMMARY OF THE INVENTION

It is an object of the present invention to meet the above-described needs and others. Specifically, it is an object of the present invention to provide a method and apparatus of conveniently storing and carrying a wireless headset for use with a telephone unit and/or audio signal source while also protecting it from damage. It is a further object of the present invention to provide a method and device for preventing the wireless headset from being lost or misplaced.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be embodied and described as a protective storage case for a wireless headset that is operable for selectively communicating with either an audio signal source or a telephone unit. The headset includes a circuitry cabinet that is suspended by wire connections between two headphones that are located at a user's ears when the headset is in use.

The protective storage case includes a rotating spool and clips on the rotating spool for releasably securing the circuitry cabinet to the spool. Consequently, rotation of the rotating spool, with the circuitry cabinet disposed thereon, winds the wire connections on the spool within the storage case.

Preferably, the case also includes a charger for charging a battery of the wireless headset that is located in the circuitry cabinet. The battery is charged by the charger when the circuitry cabinet is disposed on the rotating spool.

Preferably, a member is provided on the rotating spool for manipulation by the user to rotate the rotating spool. This member may be, for example, a knob or extension on the rotating spool or an indented or recessed portion of the rotating spool.

Similarly, additional members are preferably provided for releasably securing the headphones of the headset to the case. These additional members may be, for example, recessed portions of the case sized to frictionally accommodate the headphones or extensions on the case that frictionally secure the headphones.

The storage case of the present invention may be integrally formed as part of the audio signal source, the telephone unit or a single integrated device comprising both the audio signal source and the telephone unit. In this way, it is much less likely that the headset will become separated from the unit with which it is used.

The present invention also encompasses the method of protectively storing a wireless headset with the storage case described above by rotating a rotating spool disposed within the storage case, to which the circuitry cabinet is releasably secured, so as to wind the wire connections on the spool within the storage case.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

Figure 3:
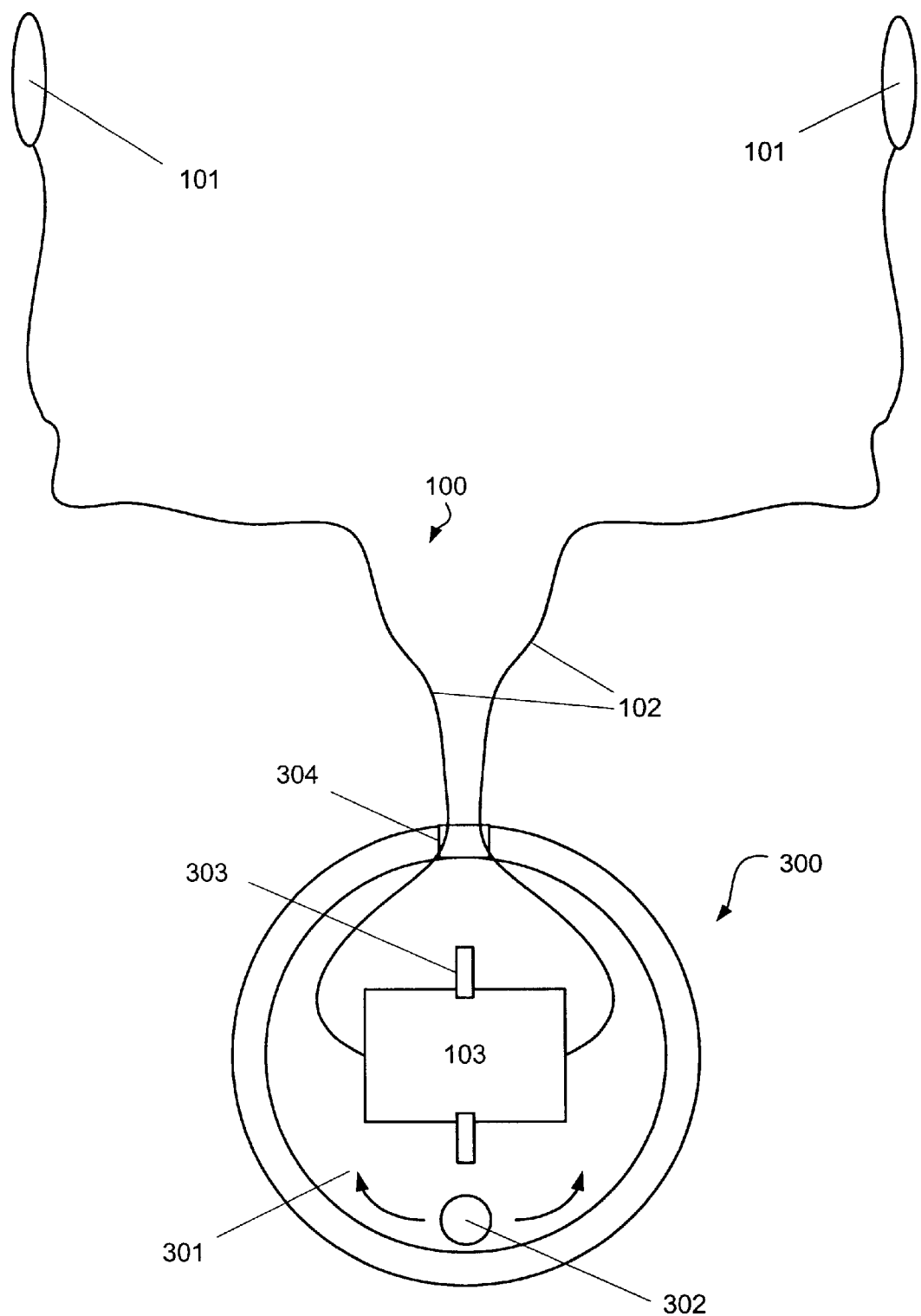
FIG. 3 is an illustration of the headset of FIG. 1 being disposed in the storage device of the present invention.

As shown in FIG. 3, the present invention includes a protective storage and carrying case (300) in which a wireless headset (100), for use with both an audio signal source and a telephone unit, can be stored. When reposed in the case (300) of the present invention, the headset (100) is protected from damage or tangling. The case (300) is also easier to transport and manage under most circumstances than the headset (100) itself.

Figure 1:
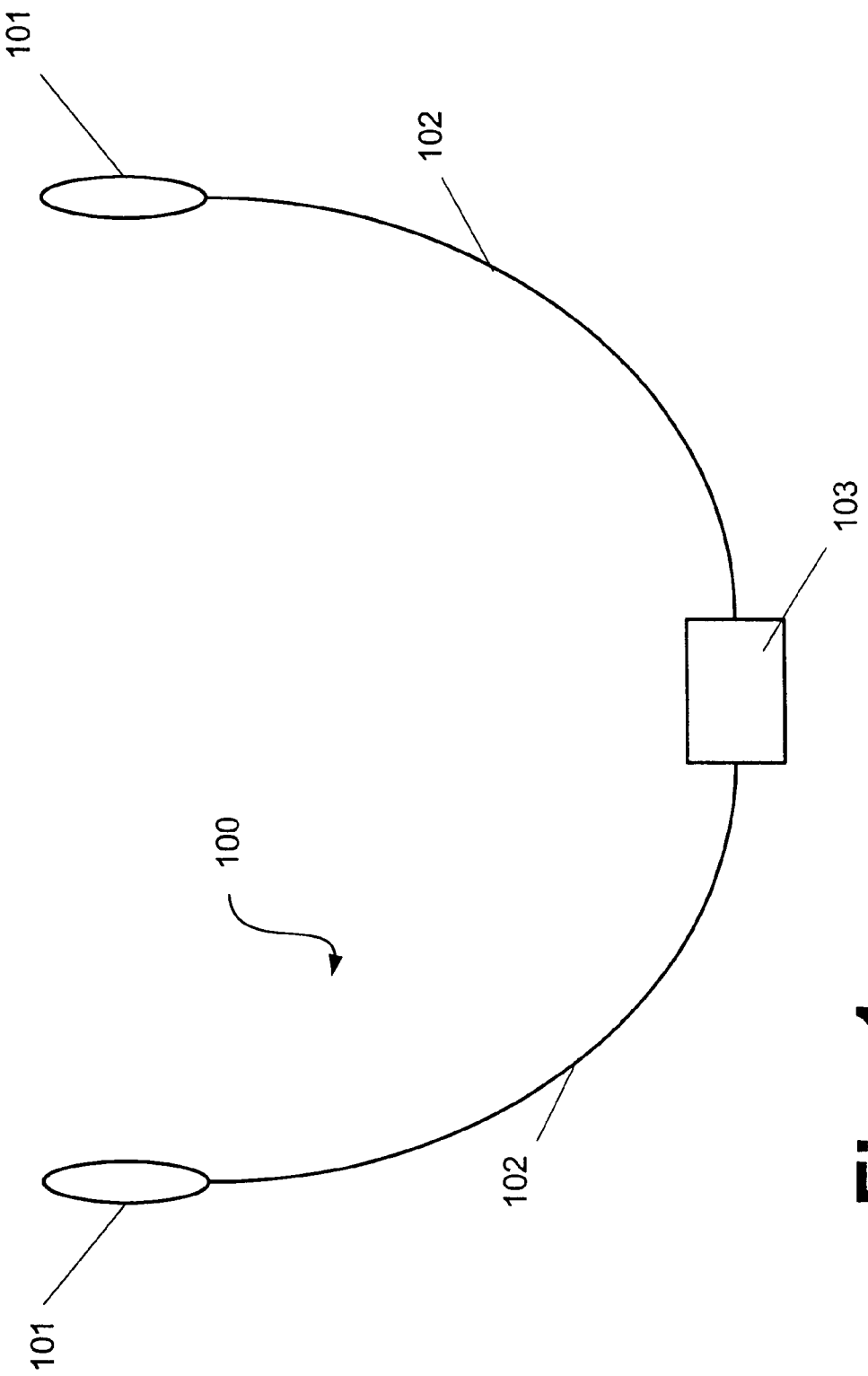
FIG. 1 illustrates an embodiment of a headset with a suspended microphone for use with the present invention, where the headset allows a user to selectively listen to audio programming and conduct telephonic communication.
Figure 2:
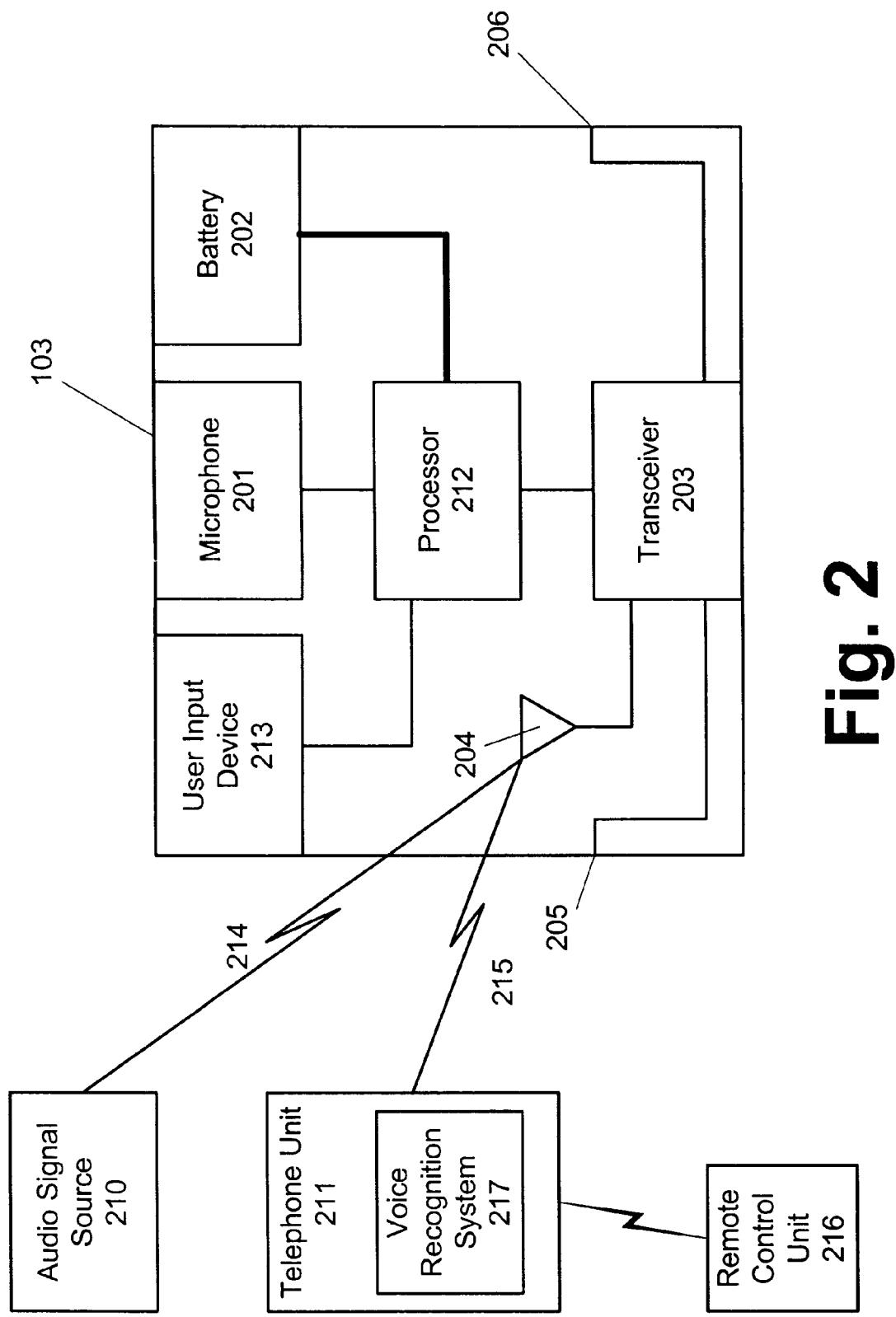
FIG. 2 is a block diagram of the suspended microphone unit of the headset illustrated in FIG. 1.

As shown in FIG. 1, the headset (100) is packed in the case (300) by disposing the microphone or circuitry cabinet (103) at the center of a rotating spool (301). The rotating spool can preferably rotate in either direction within the case (300), as shown by the arrows in FIG. 4.

Clips (303) are provided for releasably securing the circuitry cabinet (103) to the rotating spool (301). Additionally, the circuitry cabinet (103) may be releasably secured to the spool (301) by other means, for example, frictional stop members, an arm or strap that latches over the cabinet (103), Velcro-brand hook and loop fastener, or a snapping device with mating members located respectively on the cabinet (103) and the spool (201). The wires (102) of the headset (100) are disposed through an inlet passage (304) between an outer edge of the case (300) and the rotating spool (301).

A member (302) is disposed on the rotating spool (301) to better allow a user to manually rotate the spool (301). For example, the member (302) may be a knob or protrusion that the user can grasp between thumb and forefinger for the purpose of rotating the spool (301). Alternatively, the member (302) may be a recess or an indented portion of the spool into which the user can insert a finger for the purpose of rotating the spool (301).

Figure 4:
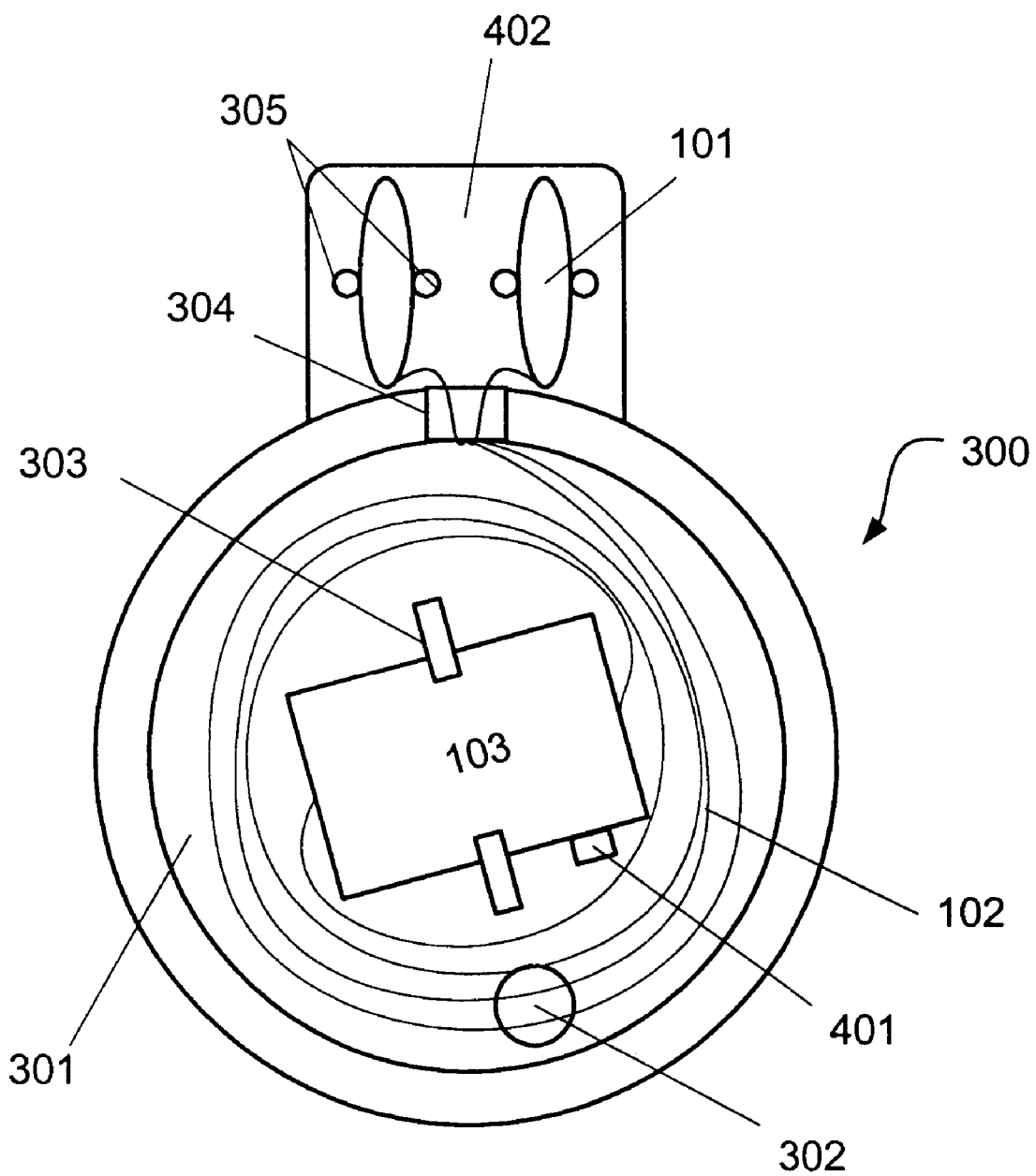
FIG. 4 is an illustration of the headset of FIG. 1 fully disposed within the storage device of the present invention.

As the spool (301) is rotated by the user, the wires (102) of the headset (100) are wound on the spool (301) around the circuitry cabinet (103). FIG. 4 illustrates the case (300) of the present invention where the headset (100) has been fully wound onto the spool (301).

When the headset (100) has been fully wound onto the spool (301), it can be readily transported with the telephone unit (211) or the audio signal source (210) without being prone to damage or tangling. When needed, the headset (100) can be readily unwound from the spool (301) and the circuitry cabinet (103) released from the clips (303) for use.

As shown in FIG. 4, the headset case (300) of the present invention may also include a portion for securing the headphones (101) of the headset (100). As shown in FIG. 4, this portion may include a number of protrusions (305), stops or clips in which the headphones (101) of the headset (100) are frictionally secured. Alternatively, recesses conforming to the size and shape of the headphones (101), and in which the headphones (101) can be frictionally secured, may be provided on the case (300) near the passage (304) such recesses may be along the exterior edge of the case (300) or on an extension (402) of the case (300) such as that as shown in FIG. 4.

Additionally, the case (300) of the present invention may be integrally formed as part of either the telephone unit (211) or the audio signal source (210). As noted above, it may be preferably for the telephone unit (211) and audio signal source (210) to be integrated into a single device, preferably a portable device. In such an arrangement, the headset case (300) of the present invention could be integrated onto the combined audio/telephone unit. In this way, there is much less likelihood that the headset (100) will be separated from the unit it is used.

The case (300) of the present invention may also include a charger (401) which contacts the battery (303) of the circuitry cabinet (103) when the cabinet is disposed in the case (303). The charger (401) is preferably an inductively coupled charging device.

In this way, the charger (401) can recharge the battery (303) while the headset (100) is in the case (300) and not in use. The case (300) may include a connection to a power source (not shown) for providing power to the charger (401) for recharging the battery (303). This power source may include an A/C adapter for connection to an electrical wall outlet or automobile cigarette lighter.

If the case (300) of the present invention is integrated with an audio signal source (210), telephone unit (211) or combination of the two, the charger (401) may also receive power from the host device, i.e., the audio signal source device (210) or telephone unit (211). The host device may, in turn, be deriving power from an internal battery or an external power source such as an A/C adapter for connection to an electrical wall outlet or automobile cigarette lighter.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A protective storage case for storing a headset, said headset having a headset circuitry cabinet, at least one headphone, and at least one headset wire connected to said headset circuitry cabinet and said at least one headphone, said protective storage case comprising:
   a rotating spool, the rotation of said rotating spool winding said at least one headset wire onto said rotating spool; and
   a circuitry cabinet storage apparatus, said circuitry cabinet storage apparatus storing said headset circuitry cabinet, wherein said headset circuitry cabinet is releasably removable from said circuitry cabinet storage apparatus.

2. The protective storage case of claim 1, wherein said circuitry cabinet storage apparatus is located within said rotating spool.

3. The protective storage case of claim 1, further comprising:
   at least one cabinet-securing member on said rotating spool for securing said headset circuitry cabinet to said rotating spool.

4. The protective storage case of claim 3, wherein said at least one cabinet-securing member releasably secures said headset circuitry cabinet to said rotating spool.

5. The protective storage case of claim 3, wherein a securing member of said at least one cabinet-securing member is one of a clip, a frictional stop member, an arm, a strap, a hook and loop fastener, and a snapping device.

6. The protective storage case of claim 1, wherein said at least one wire is wound on said rotating spool around said headset circuitry cabinet.

7. The protective storage case of claim 1, further comprising:

a headphone-securing member, said headphone-securing member being sized to secure said at least one headphone.

8. The protective storage case of claim 7, wherein said headphone-securing member is sized to frictionally secure said at least one headphone.

9. The protective storage case of claim 1, further comprising a manipulation member, said manipulation member rotating said rotating spool.

10. The protective storage case of claim 9, wherein manipulation member is one of a knob, a protrusion, a recess and an indented portion.

11. The protective storage case of claim 10, wherein said rotating spool further comprises said manipulation member.

12. The protective storage case of claim 1, further comprising:

a charger, said charger charging a battery.

13. The protective storage case of claim 12, wherein said battery is located within said headset circuitry cabinet.

14. The protective storage case of claim 12, wherein said battery is charged by said charger while said headset circuitry cabinet is stored within said circuitry cabinet storage apparatus.

15. The protective storage case of claim 1, wherein said protective storage case is integrally formed as part of an audio signal source, a telephone unit, or a single integrated device comprising both said audio signal source and said telephone unit.

16. The protective storage case of claim 1, wherein said headset circuitry cabinet includes a processor.

17. The protective storage case of claim 1, wherein said headset circuitry cabinet includes a transceiver.

18. A protective storage case for storing a headset, said headset having a headset circuitry cabinet, at least one headphone, and at least one headset wire connected to said headset circuitry cabinet and said at least one headphone, said protective storage case comprising:

a rotating spool, the rotation of said rotating spool winding said at least one headset wire onto said rotating spool;

a circuitry cabinet storage apparatus, said circuitry cabinet storage apparatus storing said headset circuitry cabinet;

at least one cabinet-securing member on said rotating spool for securing said headset circuitry cabinet to said rotating; and a headphone-securing member, said headphone-securing member being sized to secure said at least one headphone, wherein said headset circuitry cabinet is releasably removable from said circuitry cabinet storage apparatus. spool.

19. A method for storing a headset, said headset having a headset circuitry cabinet, at least one headphone, and at least one headset wire connected to said headset circuitry cabinet and said at least one headphone, said method comprising:

rotating a rotating spool to wind said at least one headset wire onto said rotating spool; and storing said headset circuitry cabinet within a circuitry cabinet storage apparatus, wherein said headset circuitry cabinet is releasably removable from said circuitry cabinet storage apparatus.

20. The method of claim 19, wherein said step of rotating said rotating spool is performed manually.

21. The method of claim 20, wherein said step of rotating said rotating spool is performed using a manipulation member.

22. The method of claim 21, wherein said manipulation member is located on said rotating spool.

23. The method of claim 21, wherein said manipulation member is one of a knob, a protrusion, a recess and an indented portion.

24. The method of claim 21, wherein manipulation of said manipulation member comprises grasping one of a knob and an extension, said one of said knob and said extension being located on said rotating spool.

25. The method of claim 21, wherein manipulation of said manipulation member comprises inserting a finger into one of a rotating spool indented portion and a rotating spool recessed portion.

26. The method of claim 19, further comprising:

charging a battery, said battery being located in said headset circuitry cabinet.

27. The method of claim 26, wherein said battery is charged by said charger while said headset circuitry cabinet is stored within said circuitry cabinet storage apparatus.

28. The method of claim 19, further comprising: releasably securing said headphones of said headset to a protective storage case, said protective storage case including said rotating spool, and said circuitry cabinet storage apparatus.

29. The method of claim 19, wherein said circuitry cabinet storage apparatus is located within said rotating spool.

30. The method of claim 19, further comprising:

securing said headset circuitry cabinet to said rotating spool.

31. The method of claim 30, wherein said step of securing said headset circuitry cabinet is performed using at least one cabinet-securing member, said at least one cabinet-securing member being located on said rotating spool.

32. The method of claim 31, wherein said at least one cabinet-securing member releasably secures said headset circuitry cabinet to said rotating spool.

33. The method of claim 32, wherein a securing member of said at least one cabinet-securing member is one of a clip, a frictional stop member, an arm, a strap, a hook and loop fastener, and a snapping device.

34. The method of claim 19, further comprising:

securing said at least one headphone, said step of securing being performed by a headphone-securing member.

35. The method of claim 34, wherein said headphone-securing member is sized to frictionally secure said at least one headphone.

36. The method of claim 19, wherein said protective storage case is integrally formed as part of an audio signal source, a telephone unit, or a single integrated device comprising both said audio signal source and said telephone unit.

37. The method of claim 19, wherein said headset circuitry cabinet includes a microphone.

38. The method of claim 19, wherein said headset is a wireless headset.

* * * * *